Patented Nov. 7, 1939

2,179,051

UNITED STATES PATENT OFFICE 2,179,051

PROCESS OF MAKING POLYVINYL ACETAL RESINS

George O. Morrison and Aubrey F. Price, Shawinigan Falls, Quebec, Canada, assignors to Shawinigan Chemicals Limited, Montreal Quebec, Canada, a corporation of Canada No Drawing. Application September 25, 1936, Serial No. 102,626. In Great Britain September 26, 1935

14 Claims. (Cl. 260—73)

This invention relates in general to improvements in polyvinyl resins and processes of making same and relates more particularly to improvements in resins prepared by hydrolysis of polyvinyl esters and especially polyvinyl acetate and condensation of the hydrolysis products with a body containing an active carbonyl group, such as a saturated aliphatic aldehyde containing at least two carbon atoms in the molecule or body yielding such an aldehyde, and especially acetaldehyde or a body yielding acetaldehyde, and relates also to products made from such resins and to processes of making the resins and products therefrom. The present invention is also an improvement on the processes and resins disclosed in United States Patent No. 2,036,092, dated March 31, 1936.

According to the aforesaid patent, polyvinyl esters are partially or completely hydrolyzed in presence of a solvent, water and an acid reacting catalyst and the hydrolysis products are condensed with an aldehyde, the condensation taking place either simultaneously with or subsequently to hydrolysis. During hydrolysis, acyl groups of the ester are replaced by hydroxyl groups and, during the condensation, the hydroxyl groups are reacted with aldehyde to form acetal groups.

In our co-pending application Ser. No. 759,318, filed December 26, 1934, there is disclosed a process of making resins by condensation of hydroylsis products of polyvinyl esters with a saturated aliphatic or an aromatic aldehyde, which resins are characterized by a high percentage acetal reaction and which, when the hydrolysis products are condensed with formaldehyde or benzaldehyde are additionally characterized by substantial absence of colour. In that application it was stated, certain precautions in respect of water and/or alcohol concentrations and temperature are necessary to protect acetaldehyde and the resins made using it, if a product of good colour and high percentage acetal reaction is to be obtained. The same applies to aliphatic aldehydes having more than two carbon atoms in the molecule and to resins made using them.

The present invention therefore deals with a process of making polyvinyl resins using saturated aliphatic aldehydes containing at least two carbon atoms in the molecule, which resins are characterized by a high percentage acetal reaction and substantial absence of colour. The difference between the process herein dealt with and that dealt with in our aforesaid application is, in general, that the influences of the various variables are in part in different direction and of different order of magnitude so that the combination of high percentage acetal reaction and substantial absence of colour lies in a different range of conditions.

The primary object of this invention is to produce improved resins of the above type, in which the improvement resides in one or more of the following characteristics, namely, a high percentage combination of hydroxyl groups coupled with substantial absence of colour; great strength, toughness, flexibility and elasticity; reasonable noninflammability; high softening temperature; stability; and insolubility in aliphatic hydrocarbons.

A further object is to produce resins suitable for the manufacture of sheets, rods, tubes and the like from which formed articles may be made by cutting, stamping, pressing or other suitable methods; films for wrapping and photographic purposes and for safety glass manufacture; threads for manufacture of artificial silk; high class surface coating compositions and other uses where nontoxicity and freedom from colour and odour are of the utmost importance; high class mouldings and for other purposes.

A still further object is to provide an improved process for the manufacture of resins as hereinbefore described.

Another object is to produce resins in the form of sheets, films, threads or fine granules directly from the solutions in which the resins are formed.

Various other objects and the advantages of the invention may be ascertained from the following description.

The foregoing objects are realized according to this invention by observing certain conditions which are essential to the realization of one or more of the stated characteristics in the resins.

It has been found that, in order to produce substantially colourless resins of the character described in the aforesaid patent, it is necessary to use a suitable catalyst, and if this is an acid, it is necessary also to protect the resins against the discolouring action of the catalyst acid and, in some cases, to protect the aldehyde against the resinifying action of the catalyst acid on the aldehyde itself, and it has been found that the foregoing may be accomplished by carrying out the reaction in presence of a sufficient amount of water or alcohol or both. The protective action of alcohols is due partly to dilution of the catalyst acid thereby, partly to the reaction of alcohol with aldehyde to form acetals which are less subject to discolouration by the catalyst acid and partly to other causes. The protective action of water is due largely to dilution of the acid thereby. Water is preferable to alcohol in many instances as a protective agent as it protects the resin and/or the aldehyde from the catalyst acid and does not interfere with the concentration of aldehyde in the reaction mixture by combination to form an acetal. If it is desirable to avoid the use of alcohols or ester-alcohol mixtures, materials which are solvents for the resin and which permit of the addition of considerable water are indicated. It has been found that aliphatic acids, such as acetic acid or propionic acid, or other solvents, such as dioxane, and the like, are suitable solvents in which to carry out the reaction and that, when such solvents are used, it is necessary to use sufficient water to replace the protective action of the alcohol. So far as colour alone is concerned, there does not appear to be any upper limit to the amounts of water or alcohol or both that may be used, but upper limits are imposed by other considerations, such as economy, time and characteristics of the resin other than colour.

It has been found also that, contrary to what might be expected in view of its well known charring action on organic matter, sulphuric acid, when properly diluted, can be used as a catalyst with aliphatic aldehydes having two or more carbon atoms in the molecule and particularly with acetaldehyde to produce colourless resins.

It has been found further that, in order to produce resins characterized by a high percentage of acetal groups, it is necessary to effect a high percentage reaction between hydroxyl groups and carbonyl groups and that, other conditions being correct, attainment of this high percentage reaction depends upon limiting the amounts of water or alcohol or both in the reaction mixture to such extent as is necessary to obtain homogeneous reaction conditions, especially toward the end of the reaction, i. e. when the acetal reaction exceeds 80%. By "homogeneous conditions" we mean that the reaction medium is a solution, colloidal or otherwise. So far as the acetal reaction alone is concerned, the alcohol and/or water could well be dispensed with but the resins produced would be dark coloured and useless for many purposes though admirable for others. However, when the acetal reaction is conducted simultaneously with the hydrolysis some water is necessary for hydrolysis. Even if water is present, alcohol may be necessary if an organic solvent having a low miscibility with water is used, for example certain aliphatic esters.

It has been found still further that in order to produce resins of improved strength, toughness, elasticity and high softening temperature, it is necessary to avoid using polymers of relatively low molecular weight and to secure a high percentage hydrolysis.

The expression "hydrolysis product of polyvinyl ester", or equivalent expression, as hereinafter used, is to be understood as indicating a substitution product of a polyvinyl ester in which product the molecule contains free hydroxyl groups capable of reacting with a body containing active carbonyl groups and irrespective of whether the molecule does or does not contain a residue of acyl groups and irrespective of whether it has or has not been partially reacted with a body containing carbonyl groups.

Broadly speaking the invention resides as to process in condensing an hydrolysis product of a polyvinyl ester with a saturated aliphatic aldehyde containing at least two carbon atoms in the molecule, or bodies liberating such aldehydes in the reaction, under conditions as to polymer identity and viscosity, solvent, catalyst, aldehyde, proportions, times, temperatures and pressures so adjusted and related according to the teaching hereinafter contained as to produce resins having one or more of the hereinbefore mentioned characteristics. As to product, the invention resides broadly in resins being condensations of hydrolysis products of polyvinyl esters with bodies above mentioned and characterized by substantial absence of colour and by an acetal content and a low percentage of free hydroxyl groups, corresponding to an acetal reaction at least 85% of complete.

More particularly, the invention resides in a process and resins, as last above stated, in which the aldehyde used is acetaldehyde or a body liberating acetaldehyde in the reaction and resides also in the particular solvents, catalysts, times, temperatures, modes or features of treatment and combinations or relations of these necessary to produce resins which have one or more of the characteristics previously mentioned.

In greater detail, the invention comprises the features and combinations of features disclosed in the foregoing and following description, together with such modifications thereof and substitutions therefor as are taught by the disclosure herein or as lie within the scope of the appended claims.

As previously stated, the hydrolysis reaction and the acetal reaction may be carried out sequentially or simultaneously. If these reactions are carried out separately, the catalyst and/or reaction media used in the one may be different from the catalyst and/or reaction media used in the other, or both reactions may be carried out using the same catalyst and reaction media.

It is preferred, however, to carry out the reactions simultaneously and this manner of operation imposes restrictions on the choice of catalyst.

For either hydrolysis or acetal reaction alone and for simultaneous hydrolysis and acetal reactions, suitable catalysts are sulphonic acids, certain strong semi-organic acids, for example, trichloracetic acid, and the mineral acids, such as sulphuric acid. Other materials, such as certain metal chlorides or sulphates, for example, zinc chloride, calcium chloride or sodium acid sulphate, which are known catalysts for acetal reactions, are not as desirable hydrolysis catalysts as those already named, but may be used to catalyze the acetal reaction when the same is performed subsequently to the hydrolysis.

The polymer viscosities herein referred to are determined according to the following method:

The polymer is dissolved in benzene and made up so that at 20° C. one litre contains the simple molecular weight in grammes. This is filtered into the apparatus through cotton-wool, precautions being taken to avoid loss of solvents. The time of outflow is then determined by the Ostwald viscosimeter, which has been standardized on a pure solvent (benzene) of which the absolute viscosity is known in centipoises.

A convenient method of determining softening temperatures of the resins is to place 10 grammes of mercury over a plug of the resin ¼ inch deep at the lower end of a 7 mm. tube and raise the temperature at the rate of 4° C. per minute. The temperature at which the mercury runs out is the softening temperature of the resin.

In all the following examples the parts referred to are by weight.

The following three comparative examples illustrate the carrying out of the invention at atmospheric pressure and using three different solvents and producing by simultaneous hydrolysis and acetal reactions, resins which are substantially colourless and are characterized by a high percentage acetal reaction.

Example 1

100 parts of polymerised vinyl acetate having a viscosity of 15 centipoises are dissolved in a mixture of 100 parts of ethyl alcohol and 85 parts of ethyl acetate. To this are added 33 parts of paraldehyde, 6.8 parts of concentrated sulphuric acid and 110 parts of water. The reaction is carried out for 15 hours at 60° C. The catalyst acid is then neutralised, for example with sodium acetate or carbonate, and the resin precipitated with water. It is then washed to remove salts and dried in warm air.

The finished resin is practically free from colour, 69% of the acyl groups have been removed and their replacement by reaction with acetaldehyde is 90% complete.

This resin is a hard tough material, soluble in the lower alcohols, esters of the fatty acids, acetone, dioxane, chloroform, tetrachlorethane, benzene and toluene but insoluble, or practically so, in the aliphatic hydrocarbons. It is useful as a protective coating, for the manufacture of sheets, rods and the like and in the manufacture of moulding compounds.

Ethyl alcohol has a definite effect on both the colour of the resin and the completeness of the acetal reaction. If more alcohol is used than is equivalent to twice the aldehyde present, low percentage acetal reactions are encountered. By "alcohol equivalent to aldehyde" is meant that amount of alcohol necessary to combine with all the aldehyde to produce an acetal. If less alcohol is used than is equivalent to 40% of the aldehyde present, then colour and solubility difficulties are encountered. Water has a definite effect on both the colour of the resin and on the completeness of the acetal reaction. If more than 40% of water based on the original polyvinyl ester solution is used, low percentage acetal resins are produced, and if the water is less than 2%, colour difficulties are encountered. Since both ethyl alcohol and water have similar influence during the reaction, it is advisable when approaching the maximum limits of one to approach the minimum limits of the other.

The temperature can vary between wide limits ranging from room temperature or below to well above the boiling point of the solvent mixture employed. The preferred temperature range, using ethyl compounds, is between 20° and 70° C.

The amount of catalyst acid used is governed by the nature of the acid, the temperature selected, the amount of water used and the desired rate of reaction. If more than 70% of sulphuric acid based on the original polyvinyl ester solution is used, colour difficulties are encountered and, if less than 0.35% of acid is used, with the temperature and other conditions regulated to give a good colour in the resin, the percentage acetal reaction will be low and the rate of reaction extremely slow. The ratio of acid to water for a colourless product should be not greater than 2.5:1.

Example 2

100 parts of polyvinyl acetate having a viscosity of 15 centipoises are dissolved in 75 parts of butyl alcohol and 110 parts of butyl acetate. 33 parts of paraldehyde, 13.6 parts of concentrated sulphuric acid and 11.6 parts of water are added and the mixture allowed to react for 10 hours at 50° C. The catalyst acid is then neutralised, for example with sodium acetate or carbonate, and the resin recovered from the reaction mixture by steam distillation or other suitable means, washed to remove salts and dried for example in a vacuum drier. The finished resin is practically free from colour, 72 per cent of the acyl groups have been removed and their replacement by reaction with aldehyde is 87% complete.

This resin is a hard, tough material the solubilities of which are substantially similar to those of the resin of Example 1 and the resin has the same uses.

Butyl alcohol has a definite effect on both the colour of the resin and the completeness of the acetal reaction. If more alcohol is used than is equivalent to the aldehyde present, then low percentage acetal reaction is encountered and, where high concentrations of polyvinyl acetate coupled with high percentage hydrolysis are used, then the solvent mixture is a poor solvent for the polyvinyl acetate. If less alcohol is used, than is equivalent to one-half of the aldehyde present, then colour difficulties are encountered.

Water has a definite effect on both the colour of the resin and the completeness of the acetal reaction. If more than 8% of water, based on the original polyvinyl acetate solution, is used, solubility difficulties due to separation or precipitation of the resin are encountered. If less than 1% of water, based on the original polyvinyl ester solution, is used, colour difficulties are encountered. Since both butyl alcohol and water have similar influence during the reaction, it is advisable when approaching the maximum limits of one to approach the minimum limits of the other. Wide limits in temperature can be used varying from room temperature or below to well above the boiling point of the solvent mixture employed. The preferred temperature range is 40° to 70° C. for this type of resin in which the hydrolysis is 75%.

The amount of catalyst acid used is governed by the nature of the acid, the temperature employed, the amount of water used and the desired rate of reaction. If more than 10% of sulphuric acid based on the original polyvinyl ester solution is used, colour difficulties are encountered and, if less than 0.6% acid is used, lower percentage acetal reaction is encountered. The ratio of acid to water should not be greater than 2:1.

Example 3

100 parts of polymerised vinyl acetate having a viscosity of 15 centipoises are dissolved in 185 parts of 50 per cent. aqueous acetic acid. To this are added 33 parts of paraldehyde and 13.6 parts of concentrated sulphuric acid. The reaction is carried out for 11 hours at 50° C. in an enamelled vessel fitted with an agitator. 17 parts of sodium hydroxide in the form of a 20% aqueous solution are added to neutralise the catalyst acid and the reaction mixture is then precipitated in water, washed and dried in warm air.

The finished resin is substantially colourless, 73.4% of the acyl groups have been removed and their replacement by reaction with aldehyde is 92%.

Water has a definite effect on both the colour of the resin and on the completeness of the acetal reaction. If more than 45% of water based on the original polyvinyl acetate solution is used, low percentage acetal reaction results and if less than 25% of water is used colour difficulties are encountered. The temperatures can vary between wide limits ranging from room temperature or below to well above the boiling point of the solvent mixture. The preferred temperature is 30° to 60° C. The amount of catalyst acid used is governed by the nature of the acid, the temperature employed, the amount of water used and the desired rate. If more than 15% of sulphuric acid based on the original polyvinyl ester solution is used, colour difficulties are encountered. The ratio of catalyst acid to water should not be greater than 1:3.

Resins produced according to the teaching in connection with any of the foregoing examples and within the limits set forth in the teaching are characterized by substantial absence of colour and by acetal reaction of 85% or higher. As one progresses upwards from the lower of said limits of water and alcohol and upwards from the lower of said limits of catalyst acid and temperature, substantial absence of colour is maintained but the percentage acetal reaction falls off gradually. Conversely, as one progresses downwards from the upper of said limits of water and alcohol and downwards from the upper of said limits of catalyst acid and temperature, the percentage acetal reaction increases gradually from approximately 85% but, after the lower of said limits of water and alcohol and the lower of said limits of catalyst acid and temperature are passed, colour becomes evident and increases rapidly.

The proportions of solvent to polymer depend chiefly upon the viscosity of the polymer and the nature of the solvent, the proportions being preferably such as will produce a reacting solution of viscosity convenient for working. For example, solutions having viscosity of 20 to 100 poises at 20° C. have been found convenient, but solutions of lower and higher viscosities may be used.

The proportion of aldehyde to polymer depends upon the percentage hydrolysis and acetal reaction desired and the amount ranges upwards from a minimum of approximately 25% excess over that theoretically required to form the desired polyvinyl acetal to an upper limit of the order of 200% beyond which colour difficulties are encountered.

Since most of the variables involved in the combined hydrolysis and acetal reaction are inter-related and some are selective at will for convenience or expediency, it is impossible to give numerical limits covering at the same time the whole range of polymer viscosities, polymer concentrations in solution or percentage hydrolysis which can be used. A set of proportion limits suitable for a polymer of given viscosity or given concentration in a given solvent might be ridiculous or impossible for a polymer of widely different viscosity or for a widely different polymer concentration in solution or for a different solvent.

Limits of catalyst acid, water, alcohol and temperature and the relations of these as set forth in connection with Examples 1, 2 and 3 apply to conditions of polymer viscosity, polymer concentration in solution and to the solvents as stated in these examples and to a limited range above and below.

The principles involved apply to the entire range of polymer viscosities, polymer concentration in solution and percentage hydrolysis and the application of these principles throughout the ranges of polymer viscosities, polymer concentrations in solution and percentage hydrolysis will be readily understood by those skilled in the art, from the teaching of the examples and the observations following each.

The proportions of constituents in the reaction media change continuously throughout the course of the reactions and the limits given in connection with Examples 1, 2 and 3 are intended to include all resulting proportions encountered during progress of the reactions. These conditions may be approached by employing combinations of initial conditions outside the limits given or other materials capable of giving similar conditions during the course of the hydrolysis.

The foregoing examples, in all of which the viscosity of the polymer and concentration of polymer in solution are the same, have been selected in order to show clearly the limitations of variations of the other variables. The following examples serve to illustrate application of the foregoing principles to a wide range of polymer viscosities, a considerable range of polymer concentrations in solution and to other aldehydes.

Example 4

100 parts of polymerized vinyl acetate having a viscosity of 45 centipoises is dissolved in 250 parts of ethyl alcohol and 50 parts ethyl acetate. 12 parts of concentrated sulphuric acid and 53 parts of acetaldehyde or paraldehyde are added. The reaction is carried on for 108 hours at 40° C. in an enamelled vessel fitted with an agitator. The catalyst acid is neutralized and the resin recovered as in Example 1.

The finished resin is practically free from colour, 98% of the acyl groups have been removed and their replacement by reaction with formaldehyde is 89% complete.

The resin is a hard tough material with characteristics similar to those of the resin of Example 1 but more pronounced, i. e. the viscosity and softening point are higher and the resin is tougher and more elastic. The uses of this resin are the same as in Example 1, but the resin is additionally useful in the manufacture of films.

Example 5

100 parts of polymerized vinyl acetate having a viscosity of 15 centipoises are dissolved in a mixture of 93 parts of ethyl acetate and 93 parts of ethyl alcohol. To this is added 54 parts of butyric aldehyde, 48 parts of water and 7 parts of sulphuric acid. The reaction is carried on for 24 hours at 60° C. in an enamelled vessel fitted with an agitator. The catalyst acid is neutralized with an excess of soda ash and the resin separated by precipitation with water or by other suitable means, washed and dried.

The finished resin is practically free from colour, 80% of the acyl groups have been removed and their replacement by reaction with butyric aldehyde is 88% complete.

Example 6

The process of Example 5 is repeated replacing the butyric aldehyde with 44 parts of propionic aldehyde and increasing the water to 96 parts.

The resin produced is substantially free from colour, 80% of the acyl groups have been removed and their replacement with propionic aldehyde is 88% complete.

The teaching in connection with Examples 1 to 4 apply to Examples 5 and 6 with the observation that slight restrictions in the limits of water and temperature and related variables are imposed by the limited miscibility of water with butyric and propionic aldehydes.

From the teaching in connection with Examples 1 to 3 and the embodiments of this teaching in Examples 4 to 6, it will be apparent to those skilled in the art that resins characterized by substantial absence of colour and by high percentage acetal reaction may be produced using polymers of viscosities, polymer concentrations in solution, solvents, percentages of hydrolysis, catalysts and temperatures, one or more of which are outside their respective ranges as disclosed by the examples. The teaching in connection with Examples 1 to 3 relating to production of resins characterized by good colour irrespective of percentage acetal reaction and to production of resins characterized by high percentage acetal reaction irrespective of colour applies also to production of such resins under conditions within and beyond the wider ranges of polymer viscosities, polymer concentrations in solution, and percentage hydrolysis disclosed by Examples 4 to 6.

The foregoing examples and the teaching in connection therewith cover variations of a process in which hydrolysis and acetal reaction are carried out simultaneously to produce resins characterized by substantial absence of colour or by high acetal reaction or by both high acetal reaction and substantial absence of colour and in which the hydrolysis may be partial or complete.

In practising this invention, the hydrolysis reaction and the acetal reaction may be performed sequentially. The acetal reaction may follow immediately after the hydrolysis reaction using the reaction media of the hydrolysis with or without modification thereof, or the acetal reaction may be completely isolated from the hydrolysis reaction as to time, place and conditions, or the conditions may be intermediate.

The hydrolysis reaction may be carried out under various conditions so as to produce either coloured or colourless hydrolysis products. In the latter case, it is essential to carry out the hydrolysis in presence of sufficient water and alcohol to protect the polymer, its hydrolysis product and possibly the solvent, if any is used, against any discolouring action of the catalyst, substantially as explained in connection with simultaneous hydrolysis and acetal reactions.

An outstanding difference between an acetal reaction performed simultaneously with hydrolysis as already described and an acetal reaction performed subsequently to hydrolysis is the much wider range in the variety and amounts of catalysts allowable in the latter case. These may range from the catalysts and amounts thereof as herein specified for simultaneous hydrolysis and acetal reaction through the same catalysts in lesser amounts, to other known catalysts for acetal reactions.

For production of substantially colourless acetal reaction products, it is necessary to start with a substantially colourless hydrolysis product and to protect the resin, and if necessary the aldehyde, from being discoloured by the catalyst. This protection ranges from the limits previously set forth for simultaneous hydrolysis and acetal reactions to as little protection as is required in the case of mild catalysts such as calcium chloride.

For production of resins with high percentage acetal reaction, the reaction media must be so adjusted that homogeneous conditions are obtained especially toward the end of the reaction, and the limits for alcohol, water, catalyst and temperature previously set forth for simultaneous hydrolysis and acetal reaction apply also to the separate acetal reaction, except in the case of mild catalysts where much larger amounts thereof are indicated.

For production of substantially colourless resins with high percentage acetal reaction, it is necessary to start with a substantially colourless hydrolysis product and to adjust the reaction media so as to obtain homogeneous conditions especially toward the end of the reaction and to work in the field which is common to the ranges last set forth for production of substantially colourless resins and for production of high acetal resins.

If the acetal reaction is carried out in the hydrolysis reaction media without modification thereof, it is obvious the conditions to obtain colourless resins with high acetal reaction must be as previously described for simultaneous hydrolysis and acetal reaction. If the catalyst remaining in the hydrolysis reaction media is neutralized and replaced by a milder catalyst or is partially neutralized, less water and/or alcohol and higher temperatures may be used without adversely affecting the colour of the resin and with benefit to the acetal reaction. It is to be noted that when the acetal reaction is effected in the unchanged hydrolysis media, hydrolysis will continue during the acetal reaction period in a manner similar to that set forth for simultaneous reaction.

The following example illustrates a process for producing resins characterized by high percentage acetal reaction and substantial absence of colour, in which process the hydrolysis and acetal reaction are sequential.

Example 7

A substantially colourless hydrolysis product of polyvinyl acetate in which the percentage hydrolysis is approximately 50% is prepared by hydrolysing polyvinyl acetate of viscosity, 2.5 centipoises for 6 hours at 60° C., in ethyl alcohol containing 5% of sulphuric acid. The catalyst is neutralized and the hydrolysis product separated from the solvent by steam distillation or other suitable means and washed to remove salts and dried. To 100 parts of this hydrolysis product, there are added 100 parts of ethyl acetate and 30 parts of ethyl alcohol, 28 parts of acetaldehyde or paraldehyde, 30 parts of water and 0.7 part of concentrated sulphuric acid and the whole reacted together for 8 hours at 60° C., in an enamel lined vessel fitted with an agitator. The catalyst acid is neutralized by addition of 1 part of soda ash and the resin is recovered by steam distillation or other suitable means, washed to remove salts and dried in a vacuum drier. The hydrolysis product need not be completely dried and, if a wet product is used in the acetal reaction, the water added in this way may be compensated for by reduction in the proportion of water added as such.

The finished resin is substantially colourless, approximately 52% of the acyl groups have been removed and the acetal reaction is 87% of complete.

The amounts of water and alcohol may be varied, but for a high percentage acetal reaction one must not exceed the limits in this connection previously set forth for simultaneous hydrolysis and acetal reaction. The limits of alcohol, water and temperature previously given for simultaneous hydrolysis and acetal reaction to obtain colourless resins may be exceeded since much less catalyst acid is used.

From all the foregoing teaching, it will be apparent to those skilled in the art that resins characterized by substantial absence of colour and by high percentage acetal reaction may be produced employing sequential steps of hydrolysis and acetal reaction and using polymers of viscosities, hydrolysis products, concentrations in solution, solvents, percentages of hydrolysis, catalysts and temperatures, one or more of which are outside their respective ranges as already disclosed.

Example 7 and the teaching in connection therewith covers a process in which hydrolysis and acetal reaction are carried out sequentially to produce resins characterized by substantial absence of colour or by high percentage acetal reaction, or by both high percentage acetal reaction and substantial absence of colour, and in which the hydrolysis may be partial or complete.

The limits of water, alcohol, catalyst and temperature taught for obtaining resins characterized by high percentage acetal reaction apply equally to acetal reactions conducted simultaneously with or substantially to hydrolysis.

Proceeding according to the teaching of the foregoing general statements and the examples and varying one or more, the proportions, times, temperatures, solvents, catalysts, aldehydes and the viscosity of the polymer, and the polymer concentration in solution, one skilled in the art may produce resins of characteristics differing as desired from those herein specifically disclosed or may produce substantially identical products under different conditions of manufacture. While the process is preferably carried out at atmospheric pressure, the pressure may be above or below atmospheric.

The resins have good dielectric properties and all may be used as an insulating lacquer on wire, while those from the lower viscosity polymers may be used in moulding the insulating parts of electrical apparatus.

The conditions already described as to catalysts, solvents, water, temperatures, polymer viscosities and concentration in solution, pressure and percentage hydrolysis and acetal reactions apply in general also to cases in which the hydrolyzed polymer is condensed with an agent other than acetaldehyde (or a body releasing acetaldehyde in the reaction) and apply in particular when propylaldehyde or butyraldehyde, are used.

The pure resins are obtained by removing the catalyst acid and solvent. These operations may be performed in various ways and relations to the use of the resins. The catalyst acid may be neutralized in the original resin solution as described in connection with Example 1, or otherwise, and the resin solution then may be extruded in the form of sheets, films or threads into air or into a precipitation bath, dried for removal of solvent, washed free from salts and finally dried.

Alternatively, the resin solutions may be extruded without previous neutralization of the catalyst acid, washed for removal of acid and dried for removal of solvents.

The resins in film, thread or granule form may be treated for reduction in the percentage of free hydroxyl groups therein by exposing them to vapours of formaldehyde, phenyl isocyanate, ketene or other suitable material.

Proceeding in general along the lines already described, useful resins may be obtained from other polyvinyl esters, such as polyvinyl propionate and polyvinyl butyrate. Polyvinyl formate is believed to be an exception. When dealing with these other ester polymers, it is desirable that the alcohols, esters or aliphatic acids used as solvents be those corresponding to the polyvinyl ester, so as to avoid formation of mixed esters or mixed acids in the solvent. Thus, methyl, ethyl, propyl or butyl propionates with or without corresponding alcohols or propionic acid are preferable with polyvinyl propionate and similarly in the case of polyvinyl butyrate.

In the following claims, the terms "aldehyde" and "acetaldehyde" are to be understood as including bodies capable of yielding an aldehyde or acetaldehyde, as the case may be, in the reaction. In addition, the term "organic solvent" is to be understood as including solvent mixtures as well as individual solvent substances.

Having thus described our invention, what we claim is:

1. A process of making substantially colourless polyvinyl resins characterized by a high percentage replacement of hydroxyl groups, which process comprises reacting on an hydrolysis product of a polyvinyl ester other than polyvinyl formate, in solution in an organic solvent, with a saturated aliphatic aldehyde containing at least two carbon atoms in the molecule, in presence of a catalyst and water, the water being present in amount between the minimum which will protect the aldehyde and the produced resin from discolouration by the catalyst and the maximum compatible with maintaining homogeneous reaction conditions when the acetal reaction exceeds 85%.

2. A process of making substantially colourless polyvinyl resins characterized by a high percentage replacement of hydroxyl groups, which process comprises reacting on an hydrolysis product of a polyvinyl ester other than polyvinyl formate, in solution in an organic solvent, including a monohydric alcohol and the ester thereof with an aliphatic acid corresponding to the polymer, with a saturated aliphatic aldehyde containing at least two carbon atoms in the molecule, in presence of a catalyst and water, the water and alcohol being present in amount between the minimum which will protect the aldehyde and the produced resin from discolouration by the catalyst and the maximum compatible with maintaining homogeneous reaction conditions when the acetal reaction exceeds 85%.

3. A process of making substantially colourless polyvinyl resins characterized by a high percentage replacement of hydroxyl groups which process comprises reacting together a polyvinyl ester other than polyvinyl formate in solution in an organic solvent, a saturated aliphatic aldehyde containing at least two carbon atoms in the molecule, and water in presence of an acid reacting catalyst, the water being present in amount between the minimum which will protect the aldehyde and the produced resin from discolouration by the catalyst and the maximum compatible with maintaining homogeneous reaction conditions when the acetal reaction exceeds 85%.

4. A process of making substantially colourless polyvinyl resins characterized by a high percentage replacement of hydroxyl groups which process comprises reacting together a polyvinyl ester other than polyvinyl formate in solution in an organic solvent including a monohydric alcohol and the ester thereof with an aliphatic acid corresponding to the polymer, a saturated aliphatic aldehyde containing at least two carbon atoms in the molecule, and water in presence of an acid reacting catalyst, the water and alcohol being present in amount between the minimum which will protect the aldehyde and the produced resin from discolouration by the catalyst and the maximum compatible with maintaining homogeous reaction conditions when the acetal reaction exceeds 85%.

5. A process of making substantially colourless polyvinyl resins characterized by a high percentage replacement of hydroxyl groups, which process comprises reacting on an hydrolysis product of a polyvinyl acetate, in solution in an organic solvent, with a saturated aliphatic aldehyde containing at least two carbon atoms in the molecule in presence of a catalyst and water, the water being present in amount between 1% and 45% of the solution.

6. A process of making substantially colourless polyvinyl resin characterized by a high percentage replacement of hydroxyl groups, which process comprises reacting together a polyvinyl acetate in solution in an organic solvent, a saturated aliphatic aldehyde containing at least two carbon atoms in the molecule and water in presence of an acid reacting catalyst, the water being present in amount between 1% and 45% of the polymer solution.

7. A process of making substantially colourless polyvinyl resins characterized by a high percentage replacement of hydroxyl groups, which process comprises reacting together a polyvinyl acetate in solution in an organic solvent including a monohydric alcohol and the acetic acid ester thereof, a saturated aliphatic aldehyde containing at least two carbon atoms in the molecule and water in presence of an acid reacting catalyst, the alcohol being present in amount between 40% and 200% of that required to combine with all the aldehyde and the water being present in amount not over 10% of the solution.

8. A process of making polyvinyl resins which comprises reacting on an hydrolysis product of a polyvinyl ester other than polyvinyl formate with acetaldehyde in presence of a catalyst and water, the water being present in amount sufficient to protect the acetaldehyde and the formed resin against discolouring action of the catalyst, and at the same time insufficient to prevent maintaining homogeneous reaction conditions when the acetal reaction exceeds 85%.

9. A process of making polyvinyl resins which comprises reacting on an hydrolysis product of a polyvinyl ester other than polyvinyl formate with acetaldehyde in presence of a catalyst, water and alcohol, the water and alcohol being present in amount sufficient to protect the acetaldehyde and the formed resin against discolouring action of the catalyst, and at the same time insufficient to prevent maintaining homogeneous reaction conditions when the acetal reaction exceeds 85%.

10. A process of making polyvinyl resins which comprises reacting on an hydrolysis product of a polyvinyl ester other than polyvinyl formate with a saturated aliphatic aldehyde containing at least two carbon atoms in the molecule in presence of a catalyst, water and an organic solvent capable of maintaining homogeneous reaction conditions when the acetal reaction is 85% complete or more, the water being present in amount sufficient to protect the formed resin and the aldehyde against discolouring action of the catalyst.

11. A process of making polyvinyl resins which comprises reacting on an hydrolysis product of a polyvinyl ester other than polyvinyl formate with a saturated aliphatic aldehyde containing at least two carbon atoms in the molecule in presence of a catalyst, water and an organic solvent including an alcohol, the solvent being capable of maintaining homogeneous reaction conditions when the acetal reaction is 85% complete or more and the water and alcohol being present in amount sufficient to protect the formed resin and the aldehyde against discolouring action of the catalyst.

12. A process of making polyvinyl resins which comprises reacting on an hydrolysis product of a polyvinyl acetate with acetaldehyde in presence of a catalyst, water and an organic solvent capable of maintaining homogeneous reaction conditions when the acetal reaction is 85% complete or more, the water being present in amount sufficient to protect the formed resin and the acetaldehyde against discolouring action of the catalyst.

13. A process of making substantially colourless polyvinyl resins, which comprises reacting together, a polyvinyl acetate in solution in an organic solvent, acetaldehyde and water in presence of sulphuric acid as catalyst, the sulphuric acid being present in amount not more than 15% of the polymer solution and the water being present in amount sufficient to protect the aldehyde and the formed resin from discolouration by the catalyst acid and in any case more than 1% of the polymer solution, the ratio of catalyst acid to water ranging downwards from a maximum of the order of between 2.5:1 and 1:3 for a reaction temperature of approximately 70° C.

14. A process of making substantially colourless resins which comprises reacting together, a polyvinyl acetate in solution in an organic solvent comprising a monohydric alcohol and the acetic acid ester thereof, acetaldehyde and water in presence of sulphuric acid as catalyst, the sulphuric acid being present in amount less than 15% of the polymer solution and the water being present in amount sufficient to protect the aldehyde and the formed resin from discolouration by the catalyst acid and in any case more than 1% of the polymer solution, the ratio of catalyst acid to water ranging downwards from a maximum of the order of 2.5:1 for a reaction temperature of approximately 70° C.

GEORGE O. MORRISON.
AUBREY F. PRICE.